United States Patent Office 2,851,492
Patented Sept. 9, 1958

2,851,492

LEAD-CATALYZED SEBACIC ACID PRODUCTION IN THE PRESENCE OF BARIUM COMPOUNDS

Frank C. Naughton, North Bergen, N. J., and Philip C. Daidone, Westbury, N. Y., assignors to The Baker Castor Oil Company, Jersey City, N. J., a corporation of New Jersey No Drawing. Application October 22, 1954
Serial No. 464,166

18 Claims. (Cl. 260—537)

This invention relates to the lead-catalyzed conversion of ricinoleic compounds into other organic compounds, including sebacic acid and salts thereof, by means of an alkali fusion process. This process is characterized by the presence of barium compounds in the alkaline bath in which the conversion is effected.

It has been known in the past to prepare sebacic acid and related compounds by the alkali fusion of ricinoleic derivatives. However, serious difficulties have been encountered, namely, violent foaming, incomplete reaction due to the transformation of the reaction mixture into a rigid mass during the heating, and the required neutralization of the alkaline bath in the process of recovering sebacic acid therefrom. Attempts to overcome the prior art difficulties have involved the use of superatmospheric pressures and a consequent need for cumbersome equipment, slow addition of the ricinoleate to the reaction bath, or the presence of high boiling, inert organic liquids. The need for these unsatisfactory expedients has been overcome in the process described below.

It is an object of this invention to prepare sebacic acid and related compounds by an improved alkaline fusion process. Another object is to provide a process which enables recovery of sebacic acid without neutralization of the alkali bath. It is a further object to eliminate the foaming and incomplete reaction difficulties encountered in the past. It is also an object of this invention to eliminate the need for conducting the reaction under super-atmospheric pressures, in the presence of inert organic liquids, and the like. A further object is to provide a simple, continuous process for the conversion of ricinoleic compounds by alkali fusion, involving the recycling of a barium compound to the fusion bath; the barium compound is used in the process substantially without loss. An additional object is to obtain the products of the process of this invention in greatly improved yields through the use of specified catalysts. Other objects will be apparent from the following description of the invention.

It has now been found that the conversion of ricinoleic compounds by means of alkali fusion proceeds smoothly and rapidly when a barium compound is added to the alkali bath in which the conversion is effected, and that the yields of desired products can be greatly increased when the conversion is conducted in the presence of a catalyst consisting of a lead compound. In general, the process of this invention involves using a heated bath comprising an alkali metal hydroxide and a barium compound, adding a ricinoleic compound, water, and a catalyst thereto, collecting and condensing the crude capryl alcohol vapors, removing the solid barium sebacate from the fusion bath by filtration without neutralization, recovering sebacic acid and a barium compound from the barium sebacate, and recycling the barium compound to the fusion bath.

The fusion bath contains an alkali metal hydroxide, such as sodium hydroxide, potassium hydroxide, or lithium hydroxide. Sodium hydroxide is the preferred alkali metal hydroxide from the solubility standpoint, the maintaining of fluidity in the fusion bath being best achieved with this hydroxide. The barium compound incorporated in the fusion bath may be a water-soluble, ionizable barium compound or a barium compound which is converted into a water-soluble, ionizable compound under the reaction conditions, typical suitable barium compounds being barium hydroxide, barium oxide, barium chloride, barium bromide, barium iodide, barium hypophosphite, barium ricinoleate, barium formate, barium acetate, barium propionate, barium phenolate, and the like. From about 2.0 to about 5.0 moles of the barium compound and from about 10 to about 20 moles of the alkali metal hydroxide should preferably be present in the fusion bath per mole of effective ricinoleic compound charged thereto. Satisfactory results are attained if the fusion bath contains at least about 0.5 mole of the barium compound and at least about 5.0 moles of the alkali metal hydroxide per mole of effective ricinoleic compound. "Effective ricinoleic compound" refers to each available ricinoleic chain; for example, in the case of castor oil, there are three such chains per molecule.

The catalysts of this invention are lead compounds selected from the group consisting of inorganic lead compounds and lead salts of organic acids. Typical lead compounds within this category include, by way of example, lead mono-oxide, lead di-oxide, lead sesqui-oxide, lead sub-oxide, red lead, lead oxychlorides, lead chloride, lead tetra-chloride, lead carbonate, lead hydroxide, lead orthophosphate, lead metaphosphate, lead pyrophosphate, lead phosphite, lead sulfate, lead acetate, lead phenolate, lead benzoate, lead oxalate, lead citrate, lead tartrate, lead ricinoleate, lead heptanoate, lead undecenoate, lead laurate, lead stearate, and lead 12-hydroxystearate. All of these and the other lead compounds in the indicated group have the common characteristic of being capable of forming plumbates or plumbites under the conditions for the conversion of ricinoleic compounds. The advantages of this invention are attained when the catalyst is present in an amount of from about 1 to about 20 wt. percent (calculated on the basis of PbO, based on the amount of ricinoleic compound being subjected to alkali fusion.

The ricinoleic compound used in the process of this invention is preferably an alkali ricinoleate. However, other ricinoleic compounds are suitable for use in the process of this invention, and include castor oil, other ricinoleic acid esters, such as methyl ricinoleate, capryl ricinoleate, and propylene glycol ricinoleate, ricinoleic acid, ricinoleic acid amides, ricinoleyl alcohol, ricinoleyl alcohol esters, and the like. The preferred alkali ricinoleates may be the salts of alkali or alkaline earth metals, e. g., sodium, potassium, lithium, calcium, and barium.

In addition to the other constituents, there should be present in the reaction zone from about 4 to about 5 moles of water per mole of effective ricinoleic compound. This result can be achieved by appropriate additions of water to the reaction zone during the course of the reaction, by in situ formation of water during the saponification of the ricinoleic compound, or by introduction of the water in the form of steam or superheated steam. A satisfactory amount of water in the fusion bath, prior to its being heated, is up to about 20% of water by wt.

The process of this invention is conducted at temperatures ranging from about 225° to about 375° C. The preferred temperature conditions involve maintaining the fusion bath at a temperature of from about 225° to about 300° C. The reaction is normally effected under partial reflux conditions. The reaction enclosure may be constructed of any suitable material, nickel and nickel alloys being exemplary thereof. The indicated reaction temperatures can suitably be attained through the application of external heat to the reactor, or by the introduction of steam or superheated steam into the reactor.

The use of an alkali metal hydroxide, such as sodium hydroxide, in the fusion bath is desirable from an economic standpoint. However, this hydroxide could not be entirely replaced, in any case, by barium hydroxide, since barium hydroxide loses its water of crystallization at about 110° C., and the resulting anhydrous compound does not melt within the range of reaction temperatures for this reaction. This is unsatisfactory, since fluidity of the fusion bath is an important factor in maintaining a smooth, rapid reaction. In this connection, it should be pointed out that calcium hydroxide is an unsatisfactory constituent of the fusion bath, since baths containing calcium hydroxide, even when an alkali metal hydroxide is present, remain solid within the range of reaction temperatures for the process of this invention.

It has been determined that the reaction is complete as soon as the addition of the ricinoleic compound to the reaction zone has been finished. This is one reason why the reaction can be conducted effectively on a continuous basis. The rate of addition of ricinoleic compound to the reaction zone is not critical. In the examples presented herewith, a convenient rate of addition was from about 0.5 to about 1.0 mole of ricinoleic compound per hour.

As indicated, the fusion bath is maintained in a fluid condition, and this eliminates the difficulty encountered in the prior art with the formation of lumps and consequent incomplete reactions. Another principal prior art difficulty, namely, bad foaming, is noted throughout the entire reaction temperature range if the barium compound is absent from the fusion bath. But, surprisingly, foaming is eliminated by the incorporation of the barium compound in the bath. Also, as indicated, the yields of desired products are considerably benefited by the use of the catalysts of this invention.

The volatile reaction products and water vapor are taken off overhead through a partial reflux system. The principal volatile product, capryl alcohol, is recovered, along with any other condensable products such as methyl hexyl ketone, by passing the volatiles through a condenser system.

The barium sebacate formed in the reaction is insoluble in the fusion bath, and thus is readily separable therefrom. This produces a decided advantage in the recovery of the sebacic acid, since neutralization of the alkali bath is eliminated. As noted, prior art methods have required such neutralization, and this meant the effective loss of the alkaline bath in the recovery of the sebacic acid therefrom.

In the case of batch reactions, subsequent to the completion of the reaction, the fusion bath can suitably be cooled and diluted with water to a solute content of substantially less than 50%, the barium sebacate being separated therefrom by filtration. The sebacic acid is obtained by acidification of the barium sebacate with a mineral acid, the sebacic acid formed being insoluble and recoverable by filtration. The sebacic acid may be purified thereafter by solution in hot water and subsequent precipitation by cooling of the solution. When the acidification step is effected with hydrochloric acid, the filtrate resulting from the separation of the sebacic acid contains barium chloride. This filtrate can be combined with the filtrate containing barium hydroxide and alkali metal hydroxide from the barium sebacate filtration, and the resulting solution concentrated to at least a 50% concentration. In this step, alkali metal chloride precipitates, and is separated by filtration. The resulting filtrate contains barium hydroxide and alkali metal hydroxide, and can be returned to the reaction enclosure for reaction with further quantities of the ricinoleic compound in the presence of a catalyst of this invention.

This procedure enables the re-use of the barium compound or compounds in the fusion bath substantially without loss. This feature represents an important advantage of the process, since it means that the additive which effects the processing improvements of this invention can be used without causing the increased operating cost which would result if the barium compounds were consumed in each run.

If desired, and especially in connection with a continuous reaction process, the fusion bath can be filtered, hot or cold, at a solute content of about 50%. This could involve little or no dilution of the fusion bath. The barium sebacate could then be worked up as per the foregoing description. On acidification of the barium sebacate, some alkali metal chloride may precipitate with the sebacic acid, but the metal chloride can be readily removed by water-washing.

Examples of the process of this invention and the advantages thereof are given below, in comparison with a run in which the lead catalyst is absent:

Example 1. (No catalyst)

The reaction was conducted in an Inconel pot, about 6 inches in diameter and about 9 inches high. The pot was equipped with a tight-fitting glass dome, which had three openings fitted with the following equipment: a metallic thermometer for recording the temperature of the reaction mass, the thermometer being replaced, when the desired reaction temperature was attained, by a powder funnel having an opening of about ½ inch in diameter; a motor-driven agitator with a sweeping-type paddle, the agitator shaft being passed through a stainless steel stuffing box; and a Y-adapter, one neck of which was fitted with a charging separatory funnel, and the other neck being fitted with a partial condenser to permit refluxing of some of the distillate (a downward condenser was attached at the upper end of the partial condenser). The Inconel pot and contents were heated by means of a heat transfer salt bath, a suitable composition for same being as follows: potassium nitrate 53%, sodium nitrate 7%, and sodium nitrite 40%.

The Inconel pot was charged with 36 moles of sodium hydroxide (1440 grams) and 1 mole of barium chloride (208 grams). This charge was thoroughly mixed, and the reactor dome with the indicated attachments was fitted into place. Heating was started, and, when the temperature of the pot contents reached 250° C., the powder funnel was inserted into the indicated dome opening. One mole of barium ricinoleate (732 grams) was charged to the reactor over a period of 1.5 hours, sufficient barium ricinoleate being present in the funnel to maintain a seal thereon. During the period of barium ricinoleate addition, water was also charged to the reactor in a slow drop-wise manner through the charging separatory funnel. Also, during this same period, the salt bath was held at a temperature of 275°–280° C., in order to maintain a reaction temperature of approximately 250° C. The water addition was continued after completion of the barium ricinoleate addition in order to recover further capryl alcohol by steam distillation of the reaction mass. Heating of the salt bath was continued for about 5 minutes after the completion of the barium ricinoleate addition and the water addition was continued until the temperature of the reaction mass had dropped to 170°–180° C., this cooling step requiring from 0.5 to 0.75 hour. The Inconel pot was then removed from the salt bath. The total recovery of capryl alcohol in the distillate amounted to 130.5 grams, or 55.8% of the theoretical yield.

As regards the recovery of sebacic acid from the fusion product, the latter was added slowly to about 3 liters of water in a stainless steel pail. The insoluble barium sebacate was then separated by filtration, a sintered steel funnel being used for this purpose. Barium hydroxide was added to the filtrate, and any resulting precipitate of barium sebacate was separated and combined with the previously separated barium sebacate. The amount of barium sebacate (tech.) recovered was 1587 grams.

Sebacic acid was recovered from the barium sebacate by placing 250 grams of the latter material in a 4 liter glass beaker, acidifying same with dilute hydrochloric acid, and bringing the beaker contents to a boil. The upper fatty layer (containing reaction by-products), which had formed during the heating, was decanted while hot. This layer was washed 5 times with between 1 and 2 liters of boiling water per wash. The washings were combined with the original aqueous layer, and the whole was cooled; the thus precipitated sebacic acid was separated by filtration, and was dried in an oven for 2 hours at 110° C. The recovery of sebacic acid amounted to 30.5 grams, which would be equivalent to a total yield of 193.5 grams, or 54.0% of the theoretical yield.

*Example 2. (19.4 wt. percent of red lead)*

The charge in this example was the same as in Example 1, except for the inclusion of 146 grams of red lead (19.4 wt. percent, calculated on the basis of PbO, and based on the amount of barium ricinoleate charged) in the initial reactor charge. The procedural steps described in Example 1 were followed in this example. The capryl alcohol recovered amounted to 174.5 grams, corresponding to a yield of 74.6% of theoretical (representing a 33.7% increase over the yield of capryl alcohol in Example 1). The sebacic acid recovery amounted to 258 grams, corresponding to a yield of 71.7% of theoretical (representing a 32.8% increase over the sebacic acid yield in Example 1).

*Example 3. (10 wt. percent of red lead)*

The charge and procedure in this example were the same as in Example 1, except for the inclusion of 75 grams of red lead (10 wt. percent, calculated on the basis of PbO, and based on the amount of barium ricinoleate charged) in the initial reactor charge. The capryl alcohol recovered amounted to 174.5 grams, corresponding to a yield of 74.5% of theoretical (representing a 33.5% increase over the yield of capryl alcohol in Example 1). The sebacic acid recovery amounted to 285 grams, corresponding to a yield of 79.2% of theoretical (representing a 46.7% increase over the sebacic acid yield in Example 1).

*Example 4. (5 wt. percent of red lead)*

The charge and procedure in this example were the same as in Example 1, except for the inclusion of 37 grams of red lead (5 wt. percent, calculated on the basis of PbO, and based on the amount of barium ricinoleate charged) in the initial reactor charge. The capryl alcohol recovered amounted to 171.5 grams, corresponding to a yield of 73.3% of theoretical (representing a 31.4% increase over the yield of capryryl alcohol in Example 1). The sebacic acid recovery amounted to 268 grams, corresponding to a yield of 74.5% of theoretical (representing a 38.0% increase over the sebacic acid yield in Example 1).

*Example 5. (2.7 wt. percent of red lead)*

The charge and procedure in this example were the same as in Example 1, except for the inclusion of 19.3 grams of red lead (2.7 wt. percent, calculated on the basis of PbO, and based on the amount of barium ricinoleate charged) in the initial reactor charge, and the addition of 700 grams of barium ricinoleate to the reactor. The capryl alcohol recovered amounted to 156 grams, corresponding to a yield of 70.0% of theoretical (representing a 25.5% increase over the yield of capryl alcohol in Example 1). The sebacic acid recovery amounted to 207 grams, corresponding to a yield of 60.6% of theoretical (representing a 12.2% increase over the sebacic acid yield in Example 1).

*Example 6. (1 wt. percent of red lead)*

The charge and procedure in this example were the same as in Example 5, except for the inclusion of 7.3 grams of red lead (1.0 wt. percent, calculated on the basis of PbO, and based on the amount of barium ricinoleate charged) in the initial reactor charge. The capryl alcohol recovered amounted to 145 grams, corresponding to a yield of 65.0% of theoretical (representing a 16.5% increase over the yield of capryl alcohol in Example 1). The sebacic acid recovery amounted to 198 grams, corresponding to a yield of 58.0% of theoretical (representing a 7.4% increase over the sebacic acid yield in Example 1).

*Example 7. (10.2 wt. percent of litharge)*

The charge and procedure in this example were the same as in Example 1, except for the inclusion of 75 grams of litharge (10.2 wt. percent, based on the amount of barium ricinoleate charged), 25 grams being added to the initial reactor charge, and the balance being well dispersed in the barium ricinoleate. The capryl alcohol recovered amounted to 170 grams, corresponding to a yield of 72.6% of theoretical (representing a 30.1% increase over the yield of capryl alcohol in Example 1). The sebacic acid recovery amounted to 277 grams, corresponding to a yield of 77.0% of theoretical (representing a 42.6% increase over the sebacic acid yield in Example 1).

*Example 8. (5.1 wt. percent of litharge)*

The charge and procedure in this example were the same as in Example 1, except for the inclusion of 37.5 grams of litharge (5.1 wt. percent, based on the amount of barium ricinoleate charged) in the initial reactor charge. The capryl alcohol recovered amounted to 183 grams, corresponding to a yield of 78.3% of theoretical (representing a 40.3% increase over the yield of capryl alcohol in Example 1). The sebacic acid recovery amounted to 296.5 grams, corresponding to a yield of 82.5% of theoretical (representing a 52.7% increase over the sebacic acid yield in Example 1).

*Example 9. (3.8 wt. percent of litharge)*

The charge and procedure in this example were the same as in Example 1, except for the inclusion of 28 grams of litharge (3.8 wt. percent, based on the amount of barium ricinoleate charged) in the initial reactor charge. The capryl alcohol recovered amounted to 168 grams, corresponding to a yield of 71.8% of theoretical (representing a 28.7% increase over the yield of capryl alcohol in Example 1). The sebacic acid recovery amounted to 270 grams, corresponding to a yield of 75.0 percent of theoretical (representing a 38.9% increase over the sebacic acid yield in Example 1).

*Example 10. (4.7 wt. percent of lead di-oxide)*

The charge and procedure in this example were the same as in Example 1, except for the inclusion of 37 grams of lead di-oxide (4.7 wt. percent, calculated on the basis of PbO, and based on the amount of barium ricinoleate charged) in the initial reactor charge. The capryl alcohol recovered amounted to 171 grams, corresponding to a yield of 73.2% of theoretical (representing a 31.2% increase over the yield of capryl alcohol in Example 1). The sebacic acid recovery amounted to 288 grams, corresponding to a yield of 80.0% of theoretical (representing a 48.2% increase over the sebacic acid yield in Example 1).

*Example 11. (3 wt. percent of lead acetate)*

The charge and procedure in this example were the same as in Example 1, except for the inclusion of 37 grams of lead acetate (3.0 wt. percent, calculated on the basis of PbO, and based on the amount of barium ricinoleate charged) in the initial reactor charge. The capryl alcohol recovered amounted to 164 grams, corresponding to a yield of 70.2% of theoretical (representing a 25.8% increase over the yield of capryl alcohol in Example 1). The sebacic acid recovery amounted to 253.5 grams, corresponding to a yield of 70.4% of theoretical (representing a 30.4% increase over the sebacic acid yield in Example 1).

*Example 12. (No barium compound; 27.9 wt. percent of lead ricinoleate)*

The charge to the Inconel reactor was 720 grams of sodium hydroxide. After this charge had been heated to reaction temperature, 400 grams of lead ricinoleate (27.9 wt. percent, calculated on the basis of PbO, and based on the amount of lead ricinoleate charged) were charged slowly to the reactor. Except for the materials charged to the reactor, the procedure was the same as in Example 1. The capryl alcohol recovered amounted to 80 grams, corresponding to a yield of 68.5% of theoretical. The sebacic acid recovery amounted to 111 grams, corresponding to a yield of 61.7% of theoretical.

*Example 13. (27.9 wt. percent of lead ricinoleate)*

The initial charge to the Inconel reactor was 720 grams of sodium hydroxide and 104 grams of barium chloride. 400 grams of lead ricinoleate (27.9 wt. percent, calculated on the basis of PbO, and based on the amount of lead ricinoleate charged) were gradually added to the heated reactor contents over a period of 1.5 hours. Except for the charge to the reactor, the procedure was the same as in Example 1. The capryl alcohol recovered amounted to 83 grams, corresponding to yield of 71.0% of theoretical (representing a 27.2% increase over the yield of capryl alcohol in Example 1, and a 3.6% increase over the yield of capryl alcohol in Example 12). The sebacic acid recovery amounted to 133 grams, corresponding to a yield of 74.0% of theoretical (representing a 37.0% increase over the sebacic acid yield in Example 1, and a 19.9% increase over the sebacic acid yield in Example 12). Examples 12 and 13, in addition to demonstrating the effectiveness of the lead catalysts of this invention, also show the desirability of the presence of barium compounds during the alkali fusion of ricinoleic compounds; in Example 13, the reaction proceeded smoothly without foaming, and more nearly approached completion.

*Example 14. (Methyl ricinoleate; 7.5 wt. percent of lead chloride)*

Two runs were made for comparative purposes, the indicated catalyst addition being made in only one of the runs. The charge to the Inconel reactor was 720 grams of sodium hydroxide and 512.8 grams of $$Ba(OH)_2 \cdot 5H_2O$$

in the catalyzed run, 29.3 grams of lead chloride (7.5 wt. percent, calculated on the basis of PbO, and based on the amount of methyl ricinoleate charged) were also charged to the reactor initially. After the temperature of the pot contents had been raised to the reaction temperature of 285°–300° C., the addition of 312.5 grams of purified methyl ricinoleate via the separatory funnel (no powder funnel was used in this example) was started, and was completed in 1.5 hours. The procedure, in other respects than those indicated, was the same as that used in Example 1. The sebacic acid yield in the catalyzed run represented an increase of 52.1% over the sebacic acid yield in the corresponding run made without catalyst.

*Example 15. (Ricinoleyl alcohol; 7.5 wt. percent of lead phenolate)*

As an Example 14, two comparative runs were made to determine the effect of the use of the indicated catalyst. The charge to the Inconel pot was 1010 grams of potassium hydroxide and 449 grams of $$Ba(OH)_2 \cdot 5H_2O$$

in the catalyzed run, 18.9 grams of lead phenolate (7.5 wt. percent, calculated on the basis of PbO, and based on the amount of ricinoleyl alcohol charged) were also charged to the reactor initially. After the pot contents had been heated to the reaction temperature of 360°–375° C., the addition of 142.5 grams of purified ricinoleyl alcohol via the separatory funnel was started, and was completed in 1.5 hours. The procedure, except as indicated, was patterned after that of Example 1. The sebacic acid yield in the catalyzed run represented an increase of 51.7% over the sebacic acid yield in the corresponding run made without catalyst.

*Example 16. (Sodium ricinoleate; 7.5 wt. percent of lead di-oxide)*

As in Example 14, two comparative runs were made to determine the effect of the use of the indicated catalyst. The charge to the Inconel pot was 400 grams of sodium hydroxide and 512.8 grams of $Ba(OH)_2 \cdot 5H_2O$; in the catalyzed run, 25.8 grams of lead di-oxide (7.5 wt. percent, calculated on the basis of PbO, and based on the amount of sodium rincinoleate charged) were also charged to the reactor initially. After the pot contents had been heated to the reaction temperature of about 250° C., 320.5 grams of sodium ricinoleate (tech.) were added to the reactor through a powder funnel over a period of 1.25 hours. On completion of the addition of the rincinoleic compound, the heating was discontinued, and the product was worked up in the manner used in the preceding examples. The procedural steps, other than those indicated, were as per those used in Example 1. The sebacic acid yield in the catalyzed run represented an increase of 49.9% over the sebacic acid yield in the corresponding run made without catalyst.

The reactions in the foregoing examples (except Example 12) went smoothly and with no foaming. But, when the barium compound was omitted from runs otherwise paralleling these examples, the resulting foaming was such as to make the process unsatisfactory from a practical standpoint. The process of this invention can also be conducted in a continuous manner, with constant charging of reactants to the fusion bath and constant removal of reaction products therefrom, with recycling of alkali metal hydroxide and barium compounds to the reactor. The most noteworthy effect of the inclusion of the catalysts of this invention is the vastly improved yields of sebacic acid and capryl alcohol which are realized. Another desirable feature of this invention is that the improved yields enable the use of simplified recovery techniques for the sebacic acid, as the yields obtainable by the process of this invention are indicative of the fact that the corresponding products are not as contaminated with fatty materials (unconverted reactants) as is the case with prior art processes.

The instant reaction proceeds simply without the need of such prior art requirements as super-atmospheric pressures and the presence of inert organic liquids, and the process has the added advantage of eliminating the need for neutralization of the alkaline fusion bath. The particular apparatus used in the foregoing examples is not essential to the process of this invention, as this process can be conducted in any equivalent apparatus which is not subject to attack by hot alkalis and which is suitably equipped for agitation of the reaction mass, introduction of the reactants, and recovery of the reaction products.

What is claimed is:
1. A process for the conversion of ricinoleic compounds into a salt of sebacic acid, which comprises charging a rincinoleic compound and water to an enclosure containing a heated, fluid alkali metal hydroxide bath, said bath containing a barium compound in an amount of from about 0.5 to about 5.0 moles per mole—equivalent of rincinoleic compound and a catalyst which is a lead compound selected from the group consisting of inorganic lead compounds and lead salts of organic acids.

2. The process of claim 1, in which said ricinoleic compound is an alkali metal salt of ricinoleic acid.

3. The process of claim 1, in which said ricinoleic compound is a ricinoleic acid ester.

4. The process of claim 1, in which said ricinoleic compound is barium ricinoleate.

5. The process of claim 1, in which said ricinoleic compound is ricinoleyl alcohol.

6. The process of claim 1, in which said alkali metal hydroxide is sodium hydroxide.

7. The process of claim 1, in which said barium compound is barium hydroxide.

8. The process of claim 1, in which said barium compound is barium chloride.

9. The process of claim 1, in which the amount of said water charged to said enclosure is sufficient to maintain from about 4 to about 5 moles of water per mole—equivalent of ricinoleic compound in the reaction zone.

10. The process of claim 1, in which said bath contains at least about 5 moles of alkali metal hydroxide per mole—equivalent of rincinoleic compound.

11. The process of claim 1, in which said catalyst is present in an amount of from about 1 to about 20 wt. percent (calculated on the basis of PbO), based on the amount of said rincinoleic compound.

12. The process of claim 1, in which said catalyst is an inorganic lead compound.

13. The process of claim 1, in which said catalyst is a lead oxide.

14. The process of claim 1, in which said catalyst is litharge.

15. The process of claim 1, in which said catalyst is an organic lead compound.

16. The process of claim 1, in which said catalyst is lead ricinoleate.

17. The process of claim 1, in which said bath is heated to from about 225° to about 375° C.

18. The process of claim 1, in which said bath is heated to from about 225° to about 300° C.

References Cited in the file of this patent

UNITED STATES PATENTS

| | | |
|---|---|---|
| 2,217,516 | Houpt | Oct. 8, 1940 |
| 2,304,602 | Schrauth et al. | Dec. 8, 1942 |
| 2,580,931 | Lane | Jan. 1, 1952 |
| 2,644,837 | Schweitzer | July 7, 1953 |
| 2,734,916 | Bolley et al. | Feb. 14, 1956 |

FOREIGN PATENTS

| | | |
|---|---|---|
| 652,355 | Great Britain | Apr. 25, 1951 |